United States Patent
Parson

[15] 3,646,911
[45] Mar. 7, 1972

[54] SORGHUM SEEDHOLDER BIRD FEEDER

[72] Inventor: Charles L. Parson, 76 N. Ogden Ave., Columbus, Ohio 43204

[22] Filed: May 11, 1970

[21] Appl. No.: 36,264

[52] U.S. Cl..............................................119/51, 119/23
[51] Int. Cl. .......................................................A01k 5/00
[58] Field of Search......................119/51 R, 23, 1; D30/14; D35/3.1, 3.2; D29/23, 24, 1.1

[56]       References Cited

UNITED STATES PATENTS

| | | | |
|---|---|---|---|
| 2,372,073 | 3/1945 | Flournoy | 119/51 X |
| 2,634,705 | 4/1953 | Mayes | 119/51 R |
| 3,163,573 | 12/1964 | Brooks | D29/1.1 |
| 2,779,311 | 1/1957 | Hamilton | 119/51 R |
| 2,366,377 | 1/1945 | Zois | D29/23 X |
| 917,655 | 4/1909 | Pittman et al. | D35/3.2 X |
| 2,261,326 | 11/1941 | Atkisson et al. | D35/3.2 X |
| 3,568,641 | 3/1971 | Kilham | 119/51 R |
| 2,113,082 | 4/1938 | Halter | 119/51 X |

Primary Examiner—Aldrich F. Medbery

[57]       ABSTRACT

A bird feeder composing an elongated body with diagonal openings on the vertical side thereof for receiving and supporting the stalks of heads of sorghum grains, the body having a hook hanger at the upper end for suspension from a tree branch, and the lower end of the body having a removable plug with a downward nail for pounding into a supporting fence, rail or fencepost.

1 Claims, 3 Drawing Figures

PATENTED MAR 7 1972  3,646,911
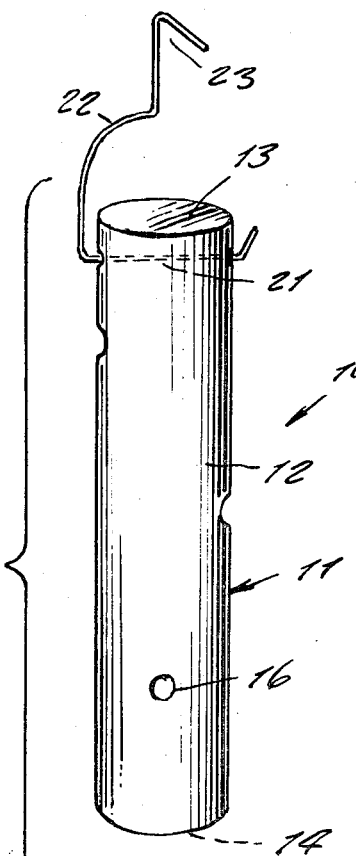
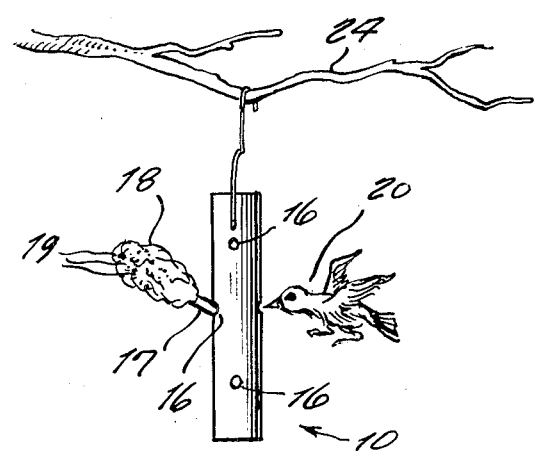
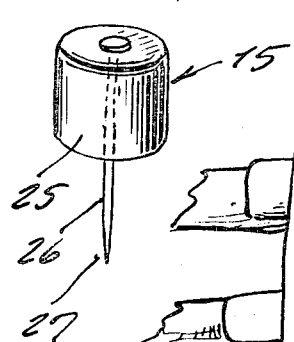
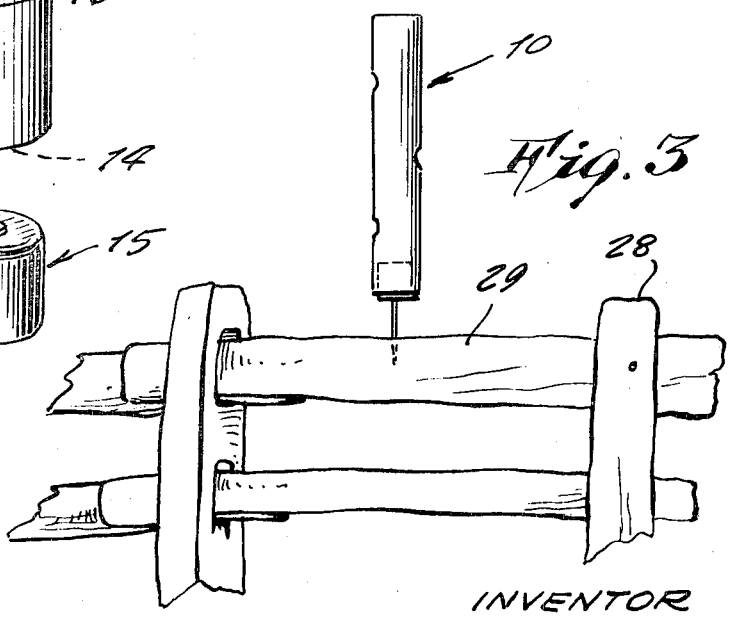
INVENTOR
CHARLES L. PARSONS

SORGHUM SEEDHOLDER BIRD FEEDER

This invention relates generally to bird feeders. More specifically the present invention relates to bird feeders for out-of-door use.

A principle object of the present invention is to provide a novel bird feeder for feeding sorghum grain to birds.

Another object of the present invention is to provide a sorghum seedholder bird feeder which may be either supported from a branch of a tree or which may be mounted by securement upon a fencepost or the like.

Still another purpose of the invention is to provide a sorghum seedholder bird feeder upon which heads of sorghum grain can be stuck around the sides thereof for easy access to a bird.

Other objects of the present invention are to provide a sorghum seedholder bird feeder which is simple in design, inexpensive to manufacture, rugged in construction, easy to use and efficient in operation.

These and other objects will be readily evident upon a study of the following specification and the accompanying drawing wherein:

FIG. 1 is a perspective view of the present invention and showing the components thereof separated, FIG. 2 is a side elevation view of the present invention shown suspended from a tree branch, and FIG. 3 is a side elevation view of the present invention shown mounted upon a fence.

Referring now to the drawing in detail, the reference numeral 10 represents a sorghum seedholder bird feeder according to the present invention wherein there is a cylindrically configurated hollow member 11 comprising the main body of the device. The body 11 may be made from rigid plastic material and includes a cylindrical sidewall 12, a circular top wall 13 and is provided with a circular opening 14 in the bottom end thereof so as to frictionally receive a cylindrically configurated plug 15.

Around the cylindrical side 12 of the body 11 there are provided a plurality of openings 16 each of which is downwardly inclined at an angle preferably so that the stalk 17 of a sorghum grain head 18 can be supported therefrom as shown in FIG. 2 of the drawing.

The sorghum grain head is provided with sorghum grains 19 upon which birds 20 can feed as shown.

A transverse opening 21 extends through the upper portion of the body 11, as shown in FIG. 1, and through which a wire hook 22 or hanger can be fitted, the upper end of the hanger being provided with hook element 23 which can be fitted over a tree branch 24 so that the feeder can be supported therefrom.

In a modified form of support for the feeder as shown in FIG. 3 of the drawing, the plug is provided with self-contained means for accomplishing the same.

The plug 15 comprises a solid member made preferably of solid plastic, the plug including a cylindrical sidewall 25 which fits within the cylindrical opening 14 of the main body 11, and the plug includes a downwardly extending nail 26 secured rigidly thereto, the lower end of the nail being pointed as shown at 27.

When the plug is thus fitted into the main body 11, the feeder may then be positioned over a post 28 or a fence rail 29 and the device pounded down until the lower end of the nail is driven into the supporting device, as shown in FIG. 3.

When retailing the present device, it is suggested that the manufacturer or retailer supply the customer with several heads of sorghum grain so to form a unitary assembly.

Four of such heads would be supported on each holder. Additional grain heads could be supplied in separate packages so that it is not necessary to purchase a holder each time.

Thus there is provided a bird feeder wherein the holders and the type of grain used make them cleaner and easier to use than present conventional bird feeders. The empty seed heads are simply thrown away and new ones inserted into the openings 16, thereby eliminating the necessity of any cleaning operation.

What I now claim is:

1. In a sorghum seedholder bird feeder, the combination of an assembly comprised of a main body and a removable plug on one end, said main body having self-contained mounting means for supporting a plurality of sorgham grain heads therefrom, said body having a support means including means on a second end for securement to a tree branch and said plug having self-contained attachment means for supporting said feeder upon a fence rail or fencepost, said body comprising an elongated cylindrical member provided with a plurality of openings on the cylindrical side thereof, said openings extending radially inwardly into said body at a downward diagonal angle so to support said sorghum grain heads, the upper end of said body having a transverse opening therethrough receiving said one end mounting means including a wire hanger received in said opening, said hanger including at its upper end a hook element for placement over said tree branch, a terminal end of said hook element extending straight angularly sidewardly downwardly, the other end of said hook element extending vertically downwardly to an arcuate portion which at its lower end has a horizontal portion fitted through said transverse opening of said cylindrical member and a terminal end thereof being upwardly sidewardly bent at an angle, a lower end of said cylindrical body being provided with a bottom opening into which said plug is frictionally fitted said plug attachment means including a downwardly extending nail integral therewith, the lower end of said nail extending outwardly of said plug and the lower end thereof being pointed for being driven into said rail fence or rail post to form said mounting means.

* * * * *